United States Patent [19]
Takashima et al.

[11] Patent Number: 5,970,161
[45] Date of Patent: *Oct. 19, 1999

[54] SPEAKER SYSTEM FOR A VIDEO MONITOR AND A VIDEO MONITOR EQUIPPED WITH A SPEAKER SYSTEM

[75] Inventors: Akira Takashima; Yuichi Komatsu; Nobuo Miura; Masayuki Hashimoto; Nobuyuki Mukaino, all of Matto, Japan

[73] Assignee: Nanao Corporation, Matto, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/765,445
[22] PCT Filed: May 16, 1996
[86] PCT No.: PCT/JP96/01307
 § 371 Date: Jan. 17, 1997
 § 102(e) Date: Jan. 17, 1997
[87] PCT Pub. No.: WO96/37085
 PCT Pub. Date: Nov. 21, 1996

[30] Foreign Application Priority Data

May 17, 1995 [JP] Japan .................................. 7-118532
Sep. 13, 1995 [JP] Japan .................................. 7-234841

[51] Int. Cl.[6] ...................................................... H04R 1/02
[52] U.S. Cl. .......................... 381/386; 381/388; 381/333
[58] Field of Search .................................. 381/24, 90, 87, 381/205, 188, 306, 333, 386, 388, 332, 300; 248/917–920; 361/681–683

[56] References Cited

U.S. PATENT DOCUMENTS 5,400,408 3/1995 Lundgren et al. ........................ 381/333
5,633,943 5/1997 Daniels et al. ............................ 391/90

*Primary Examiner*—Paul Loomis
*Assistant Examiner*—Rexford Barnie
*Attorney, Agent, or Firm*—Oblon, Spivak, McClelland, Maier & Neustadt, P.C.

[57] ABSTRACT

A speaker system removably attachable to a video monitor is described which would eliminate the complexity in mounting the speaker system as an add-on unit as well as the ungraceful appearance of the video monitor when the speaker system is removed. The top side of a case incorporating speakers is formed to match the shape of the bottom of the front panel of the video monitor. The speaker system can be mounted on the bottom of the front panel of the video monitor, which is supported on top of a base, as a locking member formed on the top of the case is engaged with a locking hole formed in the bottom of the front panel, or a locking member formed on the bottom of the front panel is engaged with a locking hole formed in the top of the case. Due to lightweight and compact construction, the speaker system can be integrally mounted on the video monitor by using dead space formed between the video monitor and its base and it can be easily removed therefrom.

27 Claims, 15 Drawing Sheets

SPEAKER SYSTEM FOR A VIDEO MONITOR AND A VIDEO MONITOR EQUIPPED WITH A SPEAKER SYSTEM

FIELD OF THE INVENTION

The present invention relates to a speaker system for a video monitor, that can easily be mounted on the video monitor as an add-on unit, as well as to a video monitor equipped with such a speaker system.

DISCUSSION OF THE BACKGROUND

An example of a conventionally known television receiver equipped with a detachable speaker system is disclosed in Japanese Unexamined Utility Model Publication No. 4-59684. A television receiver of this kind is so constructed that there are readily provided mounting spaces for accommodating speaker boxes at the left and right of the bottom front portion of the receiver chassis to allow the speaker boxes to be inserted from both sides of the receiver. A construction of the inserting mechanism is such that there are formed ridgelike structures on the top and bottom surfaces of the mounting spaces while U-shaped grooves capable of engaging the ridgelike structures are formed on the top and bottom surfaces of the speaker boxes. According to this construction, the speaker boxes are installed into the mounting spaces when inserted therein with the ridgelike structures properly fitted into the respective U-shaped grooves.

Also known in the prior art is a speaker system in which a speaker box incorporating speakers is constructed to serve as a mounting base for supporting a television receiver (e.g., Japanese Examined Utility Model Publication No. 6-35592 and Japanese Unexamined Patent Publication No. 7-23313).

Of the aforementioned prior art technology, the former construction has one drawback in that when the speaker boxes are not installed, the empty mounting spaces are exposed to view in the front of the television receiver, resulting in a deterioration of its external appearance. In addition, installation is complicated with this construction since the speaker boxes are to be individually equipped in the left and right mounting spaces.

In the latter construction of the prior art technology, the speaker box must be made strong enough to withstand the weight of the television receiver, and strengthening of the speaker box inevitably increases production costs.

The invention has been made in the light of the aforementioned problems of the prior art technology. It is therefore a principal object of the invention to provide a speaker system for a video monitor and a video monitor equipped with such a speaker system, wherein the construction of the speaker system is so simple that it can be easily attached to and removed from the video monitor and the external appearance of the video monitor is not impaired even when the speaker system is removed from the video monitor.

SUMMARY OF THE INVENTION

A speaker system for a video monitor of the invention which achieves the aforementioned object is characterized in that the speaker system comprises a laterally elongated case incorporating speakers, the top side of the case being formed to match the shape of the bottom of the front panel of the video monitor, and a locking member is formed on the top of the case while a locking hole is formed in the bottom of the front panel, or vice versa, whereby the case can be detachably mounted on the bottom of the front panel of the video monitor, which is supported on top of a base, as the locking member is engaged with the locking hole.

According to this invention, the speaker system can be integrally mounted on the video monitor by using dead space formed between the video monitor and its base. Therefore, it is not required to provide a special structure in the video monitor for accommodating the speaker system. Furthermore, the overall construction of the invention can be made compact and lightweight so that installation and removal of the speaker system becomes easier. This is because the speaker system is suspended from the bottom of the front panel of the video monitor, instead of using the speaker system as a mounting base for the video monitor. This construction is also advantageous in that the appearance of the video monitor is not impaired even when the speaker system is removed therefrom.

According to the invention, the speaker system for the video monitor may be so constructed that the aforesaid locking hole has a slit extending in the mounting direction of the case while the aforesaid locking member has a platelike guide portion which can be inserted into the slit, a stopper portion formed at the front end of the guide portion, and a clamping portion which extends from the guide portion and hooks onto an edge of the slit. Preferably, the slit would be made narrower toward the mounting direction of the case.

According to the aforementioned construction, the clamping portion is fitted into the locking hole at first. Then, while the case is held, it is moved with the guide portion sliding along the slit. The case is set in position where its movement is hindered by the stopper portion. At this point, the clamping portion hooks onto the edge of the slit and the speaker system is mounted on the video monitor, the former being suspended from the bottom of the front panel of the latter. In this construction, the guide portion which can move within the slit serves to guide the case toward its correct mounting direction while the slit which is made narrower toward the mounting direction serves to grip the guide portion and lock the case to the video monitor.

Alternatively, the aforesaid locking member may be composed of a screw. In this case, the locking hole is composed essentially of a screw hole into which the screw can be tightened. According to this construction, the case can be securely attached to the video monitor by tightening the screw and, therefore, the speaker system would not fall off the video monitor even when it is tilted up and down.

Furthermore, the aforesaid locking member may be composed of a lever having a hook at its tip end. In this case, the locking hole is constructed to fit the hook. According to this construction, the speaker system can be quickly attached to the video monitor by fitting the hook into locking hole.

The aforesaid case may incorporate a microphone and there may be provided automatically connected terminals on the top of the case. According to this construction, a microphone cord can be accommodated within the case and a sound pickup function can be accomplished while the case maintains its extremely simple external appearance. Furthermore, if the connecting terminals are used as power terminals, the speaker system is supplied with power when it is attached to the video monitor. Therefore, the need for connecting a power cord is eliminated.

A video monitor equipped with a speaker system of the invention is characterized in that the video monitor is combined with the aforementioned speaker system. According to this construction, it is possible to easily configure a video monitor equipped with a speaker system, whereby an audio playback function can be added to the video monitor.

DESCRIPTION OF THE PREFERRED EMBODIMENTS

Embodiments of the present invention are now described in the following with reference to the accompanying drawings.

Figure 1:
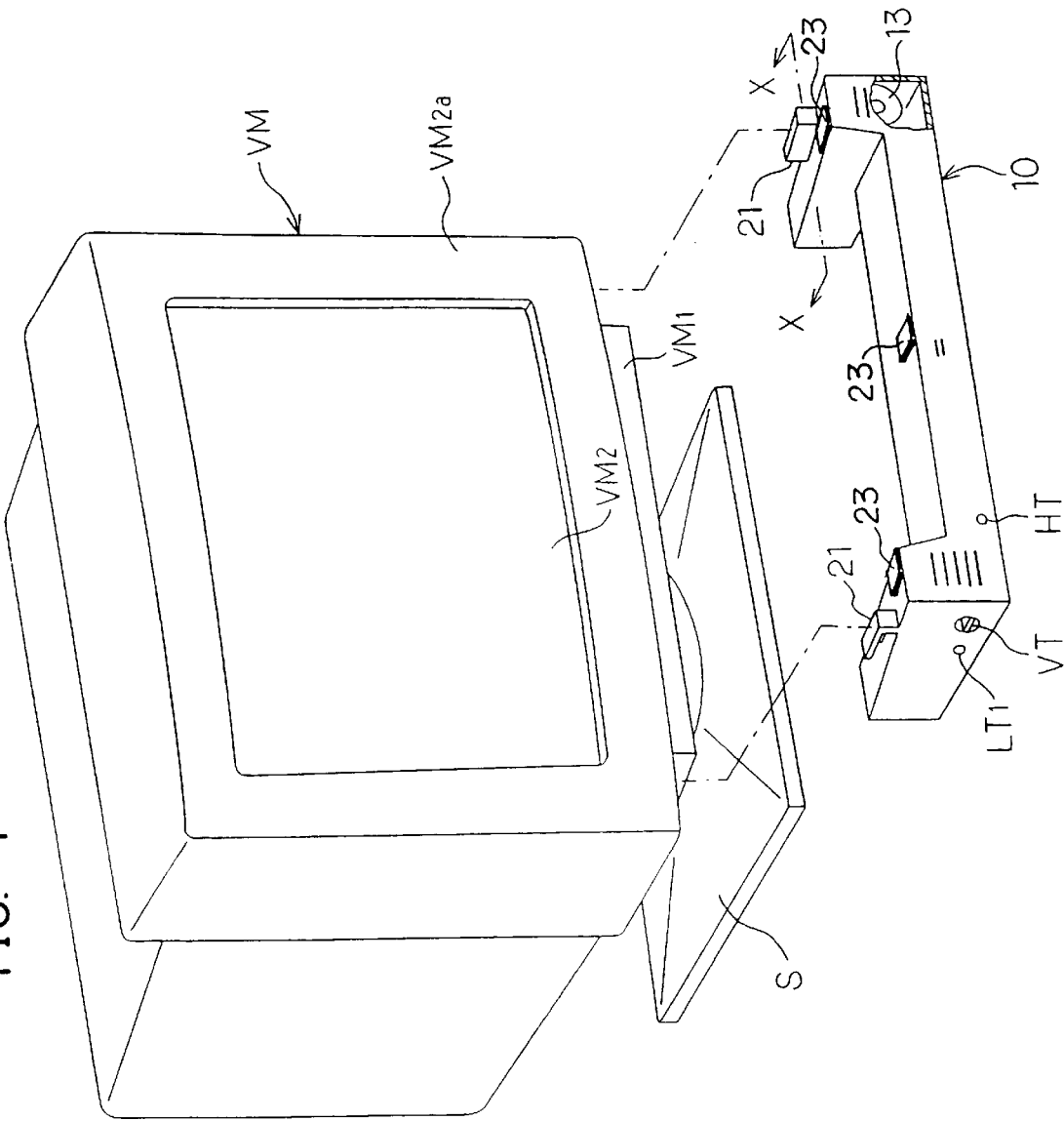
FIG. 1 is a perspective view of a speaker system and a video monitor according to the invention.

Referring to FIG. 1, a speaker system for a video monitor of this invention mainly comprises a case 10, which can be mounted on the bottom front portion of the video monitor VM. The video monitor VM is supported by a base S which permits free turning in a horizontal plane as well as vertical tilting of the video monitor. A projecting part VM1 is formed on the bottom front portion of the panel surface of the video monitor VM, and a display VM2, provided with a front panel VM2a, is mounted on the front side.

Figure 2:
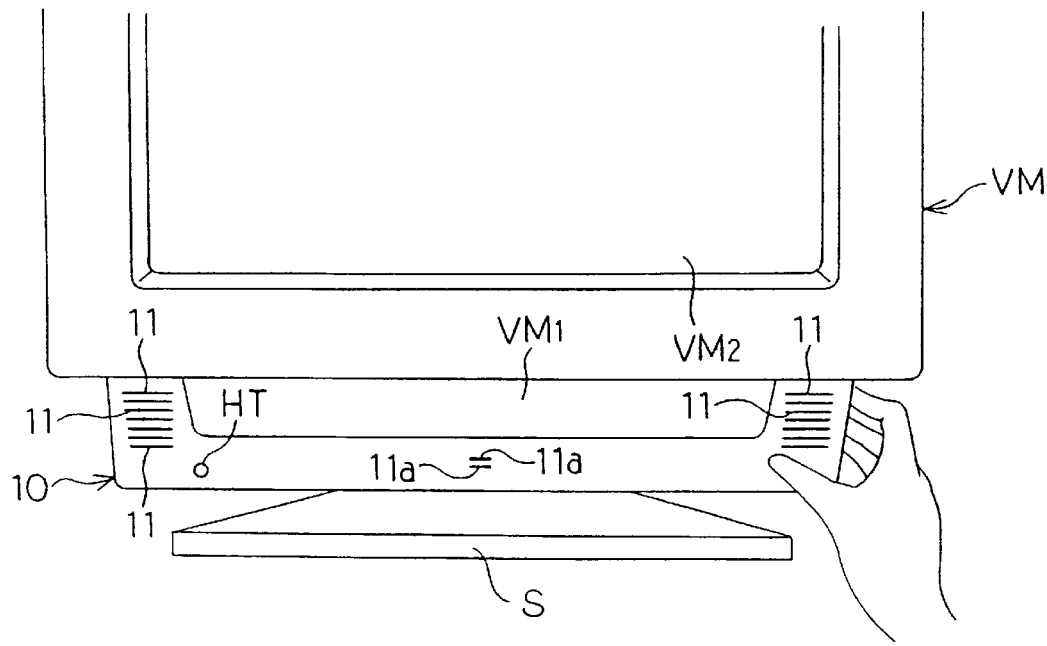
FIG. 2 is a front view showing the appearance when the speaker system is installed.
Figure 3:
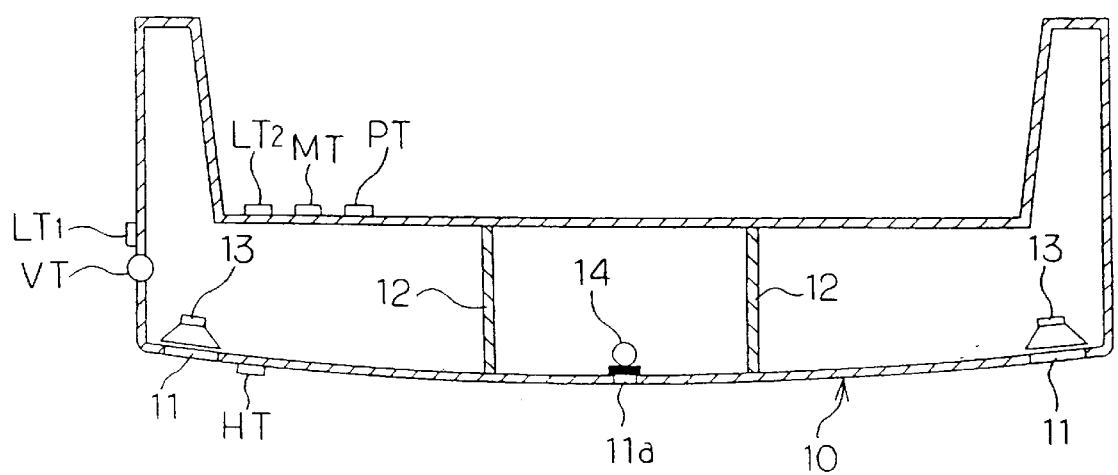
FIG. 3 is a transverse sectional view of the speaker system.

The case 10 of the speaker system is built into a specific, laterally elongate form (see FIG. 2) and its top side is formed to fit the shape of the bottom front portion of the panel surface of the video monitor VM including the projecting part VM1. There are formed a number of slits 11 on the left and right of the front surface of the case 10 and shorter slits 11a in the middle of the front surface of the case 10. The case 10 is further equipped with a headphone terminal HT on the front surface, an input terminal LT1 and a volume control knob VT on one side surface, an input terminal LT2, a microphone terminal MT and a power terminal PT on the rear surface, as shown in FIG. 3.

Partition plates 12 are provided inside the case 10 to form an isolated space in the middle of the case 10. Speakers 13 are mounted on the left and right of the case 10 while a microphone 14 is mounted in the center of the case 10. The speakers 13 are located at positions corresponding to the left and right slits 11 respectively, while the microphone 14 is located at a position corresponding to the slits 11a.

Figure 4:
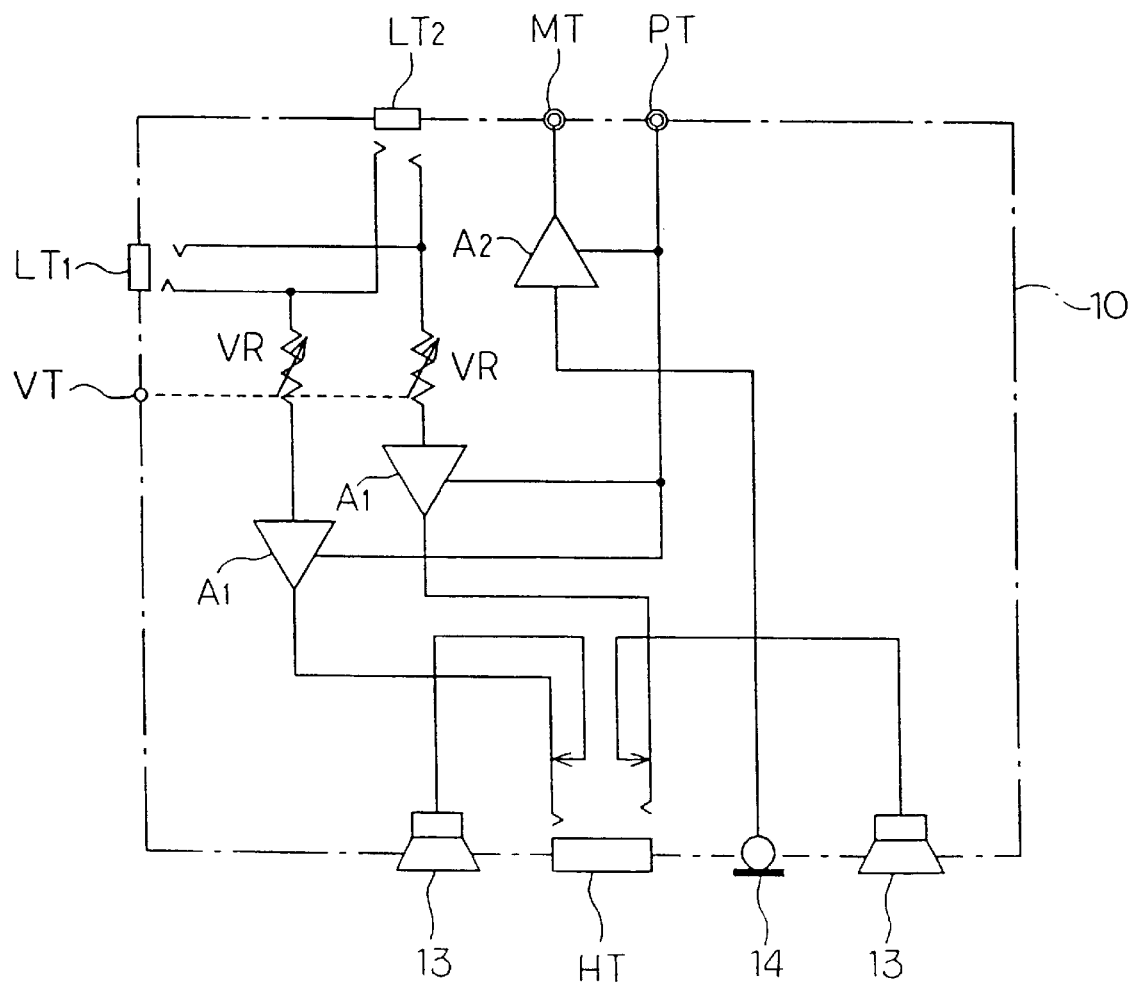
FIG. 4 is a circuit diagram of the speaker system.

Referring to FIG. 4, the case 10 incorporates an electric circuit including amplifiers A1 and A2. The two-channel input terminals LT1 and LT2 are connected to the speakers 13 via respective potentiometers VR, the amplifiers A1 and the headphone terminal HT.

The microphone 14 is connected to the headphone terminal HT via the amplifier A2, while the power terminal PT is connected to the individual amplifiers A1 and A2. The headphone terminal HT is composed essentially of a jack having switching contacts resettable by spring. When the plug of a headphone is inserted into the headphone terminal HT, output circuits to the speakers 13 are cut off and an audio output is switched to the headphone. When the plug is disconnected, the audio output is switched back to the speakers 13.

Figure 5:
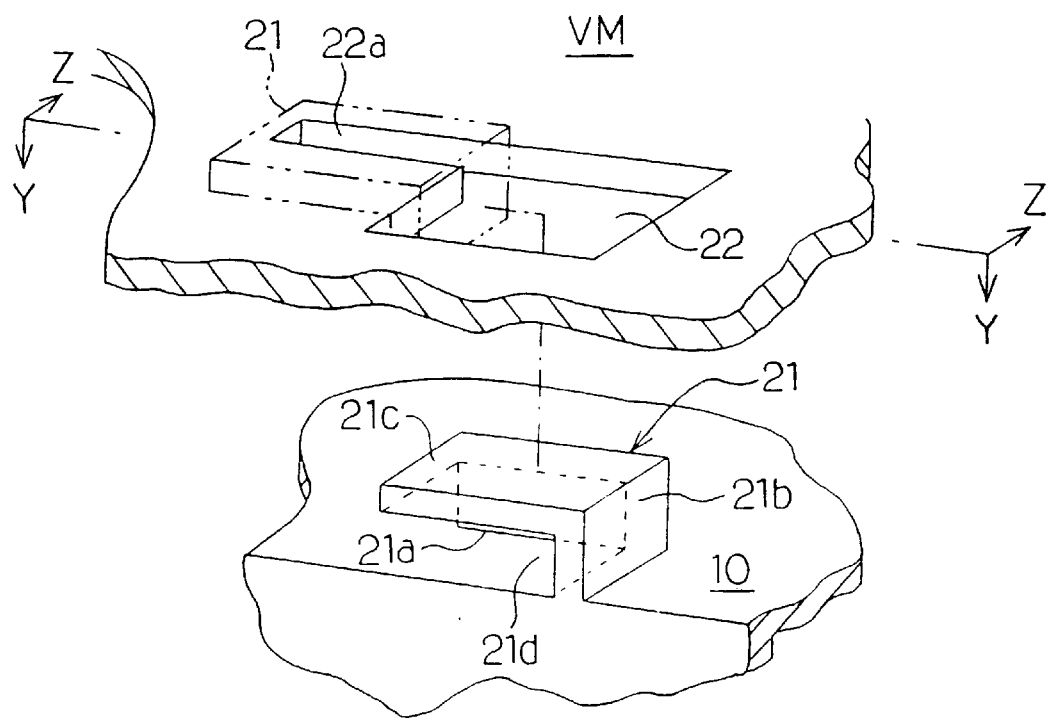
FIG. 5 is a fragmentary enlarged view showing a construction of a locking member and a locking hole.

Referring to FIG. 5, there are projectingly formed hook-shaped locking members 21 arranged in a symmetrical configuration at the left and right of the top side of the case 10 (only the left-hand locking member is shown). There are formed locking holes 22 in the bottom surface of the video monitor VM at positions corresponding to the respective locking members 21.

Each locking member 21 comprises a platelike guide portion 21a which extends in the mounting direction of the case 10 (i.e., in the front-to-rear direction of the video monitor), a platelike stopper portion 21b which extends like a hook from the rear end of the guide portion 21a, and a clamping portion 21c which extends from upper edges of the guide portion 21a and the stopper portion 21b forming a surface parallel to the top side of the case 10.

Figure 6:
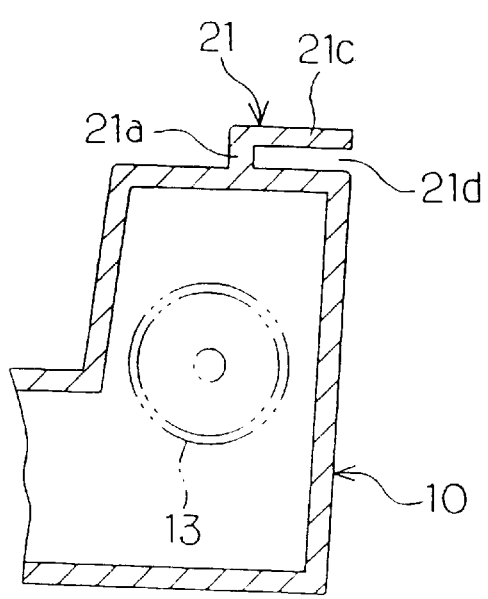
FIG. 6 is a sectional view taken in the direction of arrows X—X of FIG. 1.

As shown in FIG. 6, the guide portion 21a and the clamping portion 21c form together an inverted L-shaped cross section to configure a hooking cavity 21d opening toward one side of the case 10, wherein the rear end of the hooking cavity 21d is closed by the stopper portion 21b.

Figure 7:
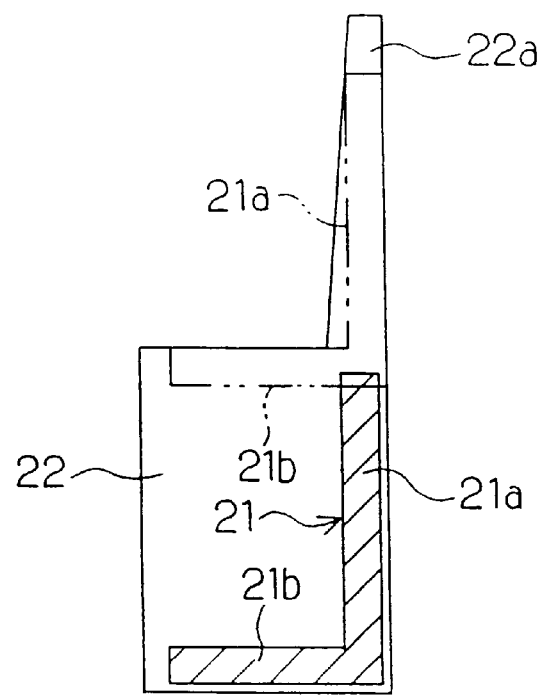
FIG. 7 is an enlarged view as seen in the direction of arrows Y—Y of FIG. 5.

Each locking hole 22 has a rectangular opening through which the clamping portion 21c of one locking member 21 can be inserted and a slit 22a, which connects to the opening, extends to the rear of the video monitor VM, as shown in FIG. 7. The width of each slit 22a matches the thickness of the guide portion 21a of each locking member 21, and each slit 22a is tapered or made narrower toward the rear of the video monitor VM.

Figure 8:
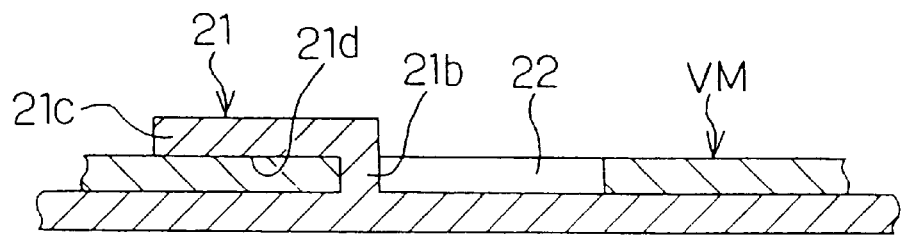
FIG. 8 is an enlarged sectional view taken in the direction of arrows Z—Z of FIG. 5.

Therefore, the speaker system can be mounted on the bottom of the front panel of the video monitor VM by inserting the locking members 21 into the respective locking holes 22 and then sliding the speaker system in the rearward direction of the video monitor VM (as shown by alternate long and two short dashed lines in FIG. 5). When the speaker system is slid rearward, the guide portion 21a of each locking member 21 is guided by the corresponding slit 22a, and when the stopper portion 21b of each locking member 21 comes into contact with an edge of the opening in the corresponding locking hole 22, the guide portion 21a is gripped by the tapered slit 22a to the case 10 in position (as shown by alternate long and two short dashed lines in FIG. 7). Since each clamping portion 21c hooks onto an edge of the corresponding slit 22a at this point, as shown in FIG. 8, the speaker system can be suspended from the bottom front portion of the panel surface of the video monitor VM by way of the clamping portions 21c.

If the video monitor VM is provided with an output terminal, a microphone terminal and a power terminal (which are not illustrated) corresponding respectively to one of the input terminals LT1, LT2, the microphone terminal MT and the power terminal PT of the video monitor VM and these corresponding terminals are connected to each other, an audio signal output from the video monitor VM can be delivered to the speakers 13, and an audio signal, which is picked up and converted by the microphone 14, can be fed into the video monitor VM.

Furthermore, if the output terminal, the microphone terminal and the power terminal of the case 10 corresponding respectively to the input terminal LT2, the microphone terminal MT and the power terminal PT of the video monitor VM are configured with automatically connected terminals, it is possible to accomplish electric connections between the corresponding terminals by simply mounting the speaker system on the video monitor VM.

When removing the speaker system from the video monitor VM, the case 10 should be slid in a frontward direction of the video monitor VM. When the guide portions 21a of the locking members 21, have come off the slits 22a and have been shifted into the locking holes 22, the locking members 21 are removed from the locking holes 22 by moving the case downward. In other words, the speaker system can be removed from the video monitor VM by pulling the speaker system frontward and then moving it downward. When the speaker system has been removed, only the locking holes 22 are exposed on the bottom of the video monitor VM. Therefore, the external appearance of the video monitor VM is not impaired.

The construction of each locking member 21 is not limited to what has been described in the aforementioned embodiment. In one alternative, each locking member 21 may be constructed in such a way that its guide portion 21a and clamping portion 21c form together a T-shaped cross section. In this case, there are formed a pair of hooking cavities 21d on the left and right sides of the guide portion 21a and therefore a slit 22a extends from the center of the opening of each locking hole 22 in the rearward direction of the video monitor VM to match the location of the guide portion 21a.

In another alternative, there may be provided vibration insulators 23, . . . at the left, right and central positions of the top side of the case 10 (see FIG. 1). The vibration insulators 23, . . . serve to prevent wavering of on-screen images due to mechanical vibrations transmitted from the speakers 13 to the case 10 when the video monitor VM is used with the speaker system mounted thereto. The vibration insulators 23, . . . may be composed of such elastic materials like rubber or clayey plastic materials which can effectively attenuate mechanical vibrations.

Figure 9:
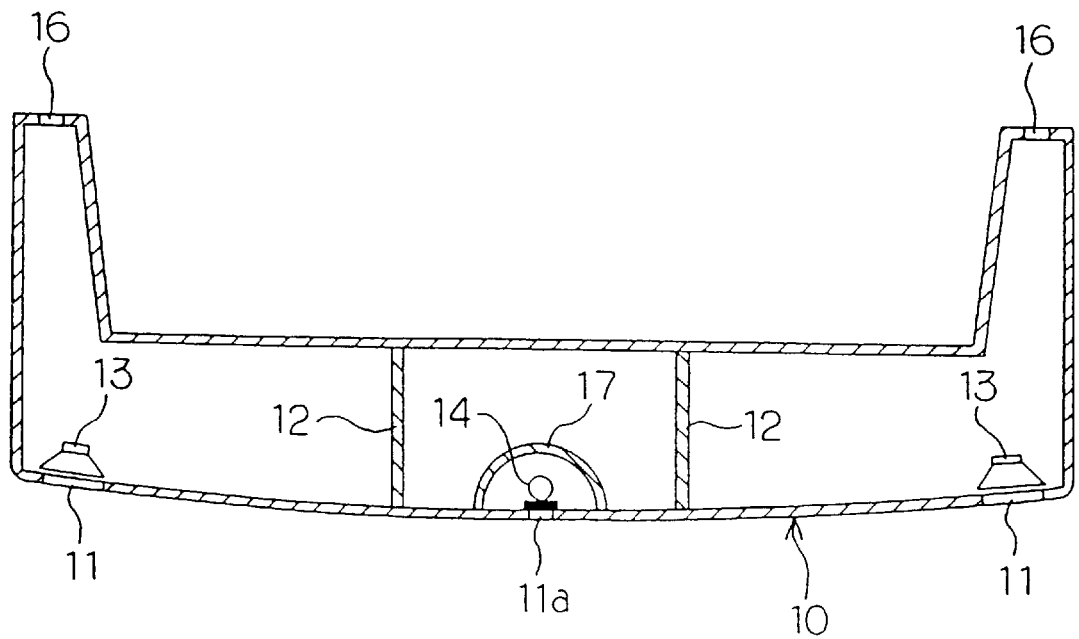
FIG. 9 is a diagram similar to FIG. 3 showing a speaker system according to another embodiment.

In FIG. 9, through holes 16 are formed at the back of individual speakers 13 mounted in the case 10. In this construction, the through holes 16 permit part of the sound waves generated by the speakers 13 to be emitted from the back of the case 10 and this serves to enhance the clarity of reproduced sound output through slits 11, . . . in the front surface of the case 10.

In addition, there is provided a cover 17 close to the microphone 14 within the case 10. This cover 17 is to prevent a howling noise which would be generated when the reproduced sound output from each speaker 13 is picked up by the microphone 14 and amplified.

Figure 10:
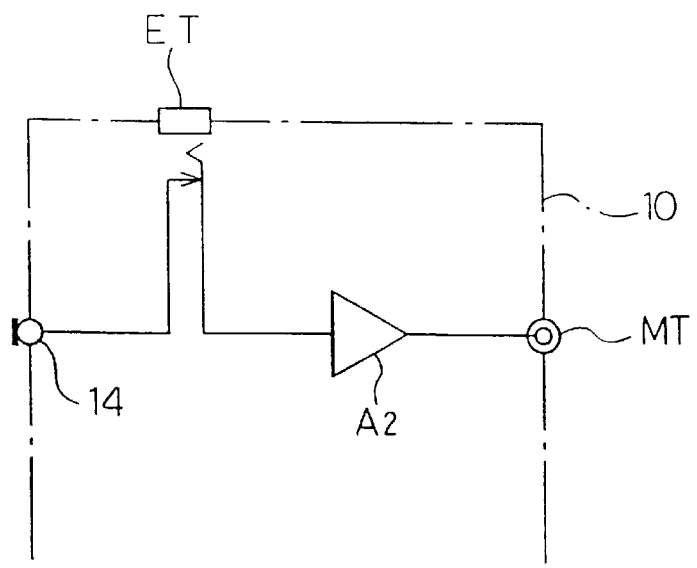
FIG. 10 is a circuit diagram of the microphone additionally connected to the speaker system.

In the construction of the aforementioned case 10, it is also possible to install an input terminal ET for an external microphone on one side surface of the case 10 as shown in FIG. 10. The input terminal ET is composed of a jack having switching contacts resettable by spring and is connected in series with the microphone 14. Therefore, when a plug of the external microphone is inserted to the input terminal ET, the external microphone, instead of the microphone 14, is connected to an amplifier A2. When the plug is disconnected, the microphone 14 is reconnected to the amplifier A2.

Figure 11:
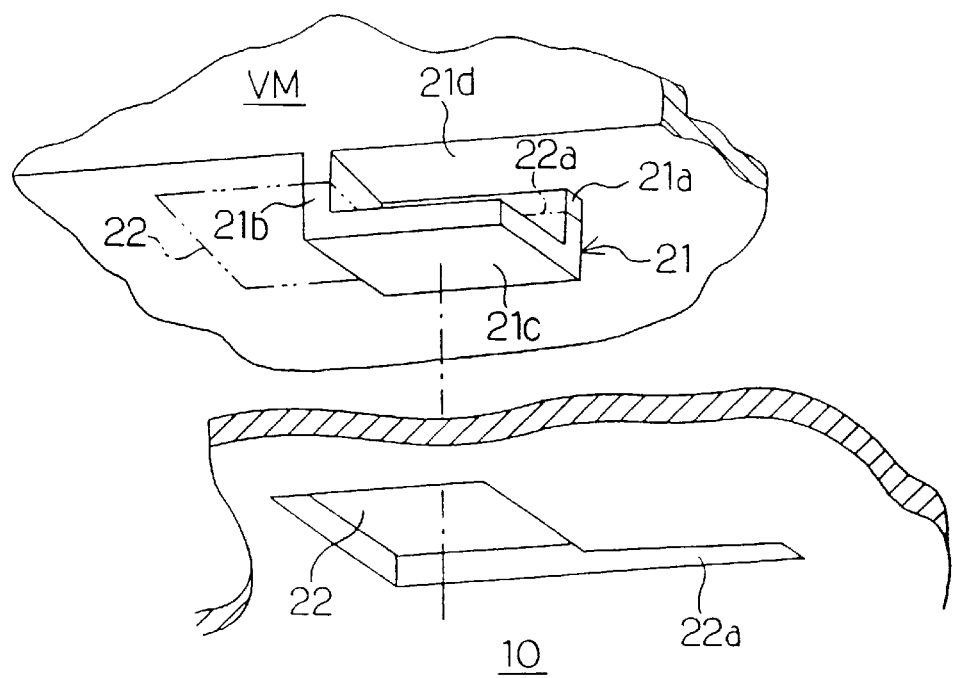
FIG. 11 is a diagram similar to FIG. 5 showing another construction of a locking member and a locking hole.

FIG. 11 is a diagram similar to FIG. 5 showing a second construction of a locking member and a locking hole. In contrast to the foregoing embodiment, locking members 21 are formed on the video monitor VM while locking holes 22 are formed in the case 10. This construction also allows a speaker system to be mounted on the video monitor VM.

In this construction, a slit 22a formed in each locking hole 22 is made narrower toward the front of the case 10. Also, a hooking cavity 21d of each locking member 21 is closed at its front end by a stopper portion 21b in the insertion direction. Therefore, the speaker system can be mounted on the bottom of the front panel of the video monitor VM by inserting each locking member 21 into the corresponding locking hole 22 and then sliding the case 10 in the rearward direction of the video monitor VM (as shown by alternate long and two short dashed lines in FIG. 11).

Figure 12:
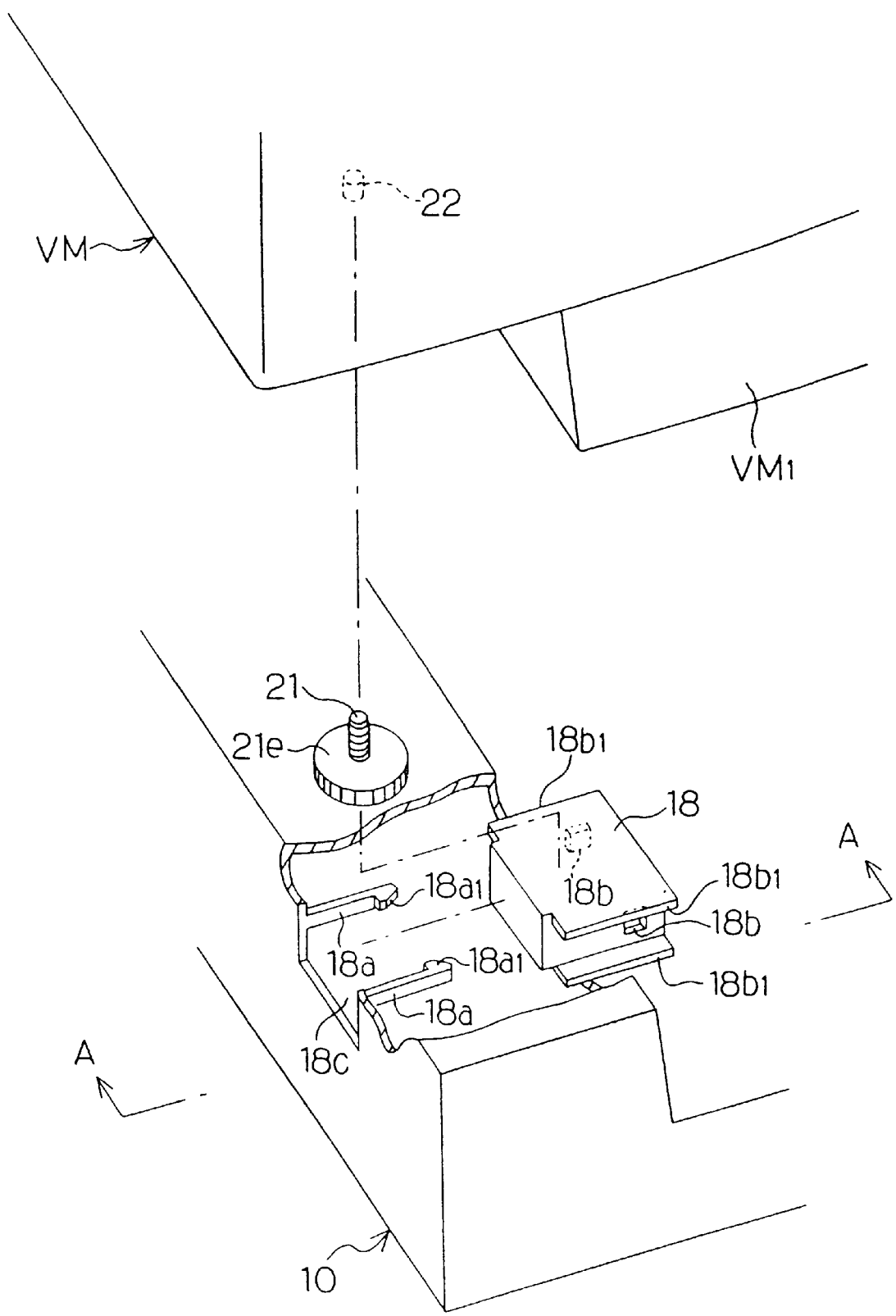
FIG. 12 is a partially cutaway enlarged perspective view showing yet another construction of a locking member and a locking hole.
Figure 13:
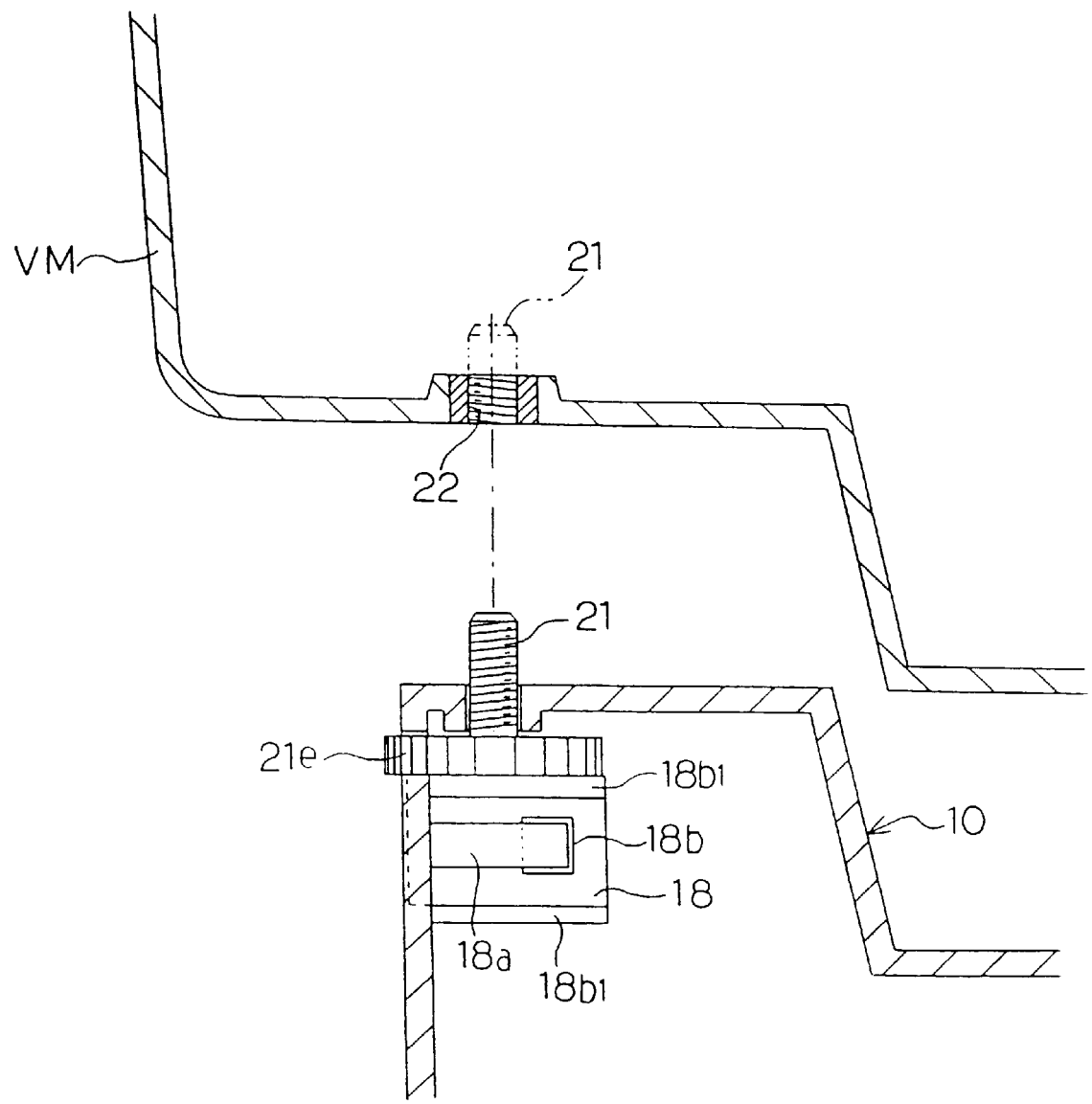
FIG. 13 is an enlarged sectional view taken in the direction of arrows A—A of FIG. 12.

FIGS. 12 and 13 illustrate a third construction of a locking member and a locking hole. The locking member shown in these Figures is composed principally of a screw 21. More specifically, the screw 21 has a disk-like knob 21e from which a screw portion projects, and the outer surface of the knob 21e is knurled to prevent slippage. Each screw 21 is incorporated in the case 10 together with a positioning block 18 in such a way that part of the outer surface of the knob 21e protrudes from the side surface of the case 10. Each screw 21 is rotatably mounted on top of the block 18, which is secured inside the case 10 by hooks 18a, closing up an opening 18c made in the side surface of the case 10.

Pairs of parallel guide ribs 18b1, are projectingly formed along upper and lower edges on both side surfaces of each block 18. When a block 18 is inserted along the hooks 18a, 18a with the guide ribs 18b1, . . . aligned parallel thereto so that the block 18 closes the opening 18c, angled tips 18a1 of the hooks 18a are engaged with holes 18b, formed on both side surfaces of the block 18. Therefore, the block 18 can be firmly secured to the case 10. In the bottom of a front panel of a video monitor VM, there are formed nuts 22 into which each screw 21 can be tightened.

The case 10 can be mounted on the bottom of the front panel of the video monitor VM by turning the knob 2 1e of each screw 21 to tighten it into the corresponding nut 22 (as shown by alternate long and two short dashed lines in FIG. 13). The case 10 can be removed by turning the knob 21e of each screw 21 in the reverse direction to undo each screw 21 from the corresponding 22.

Figure 14:
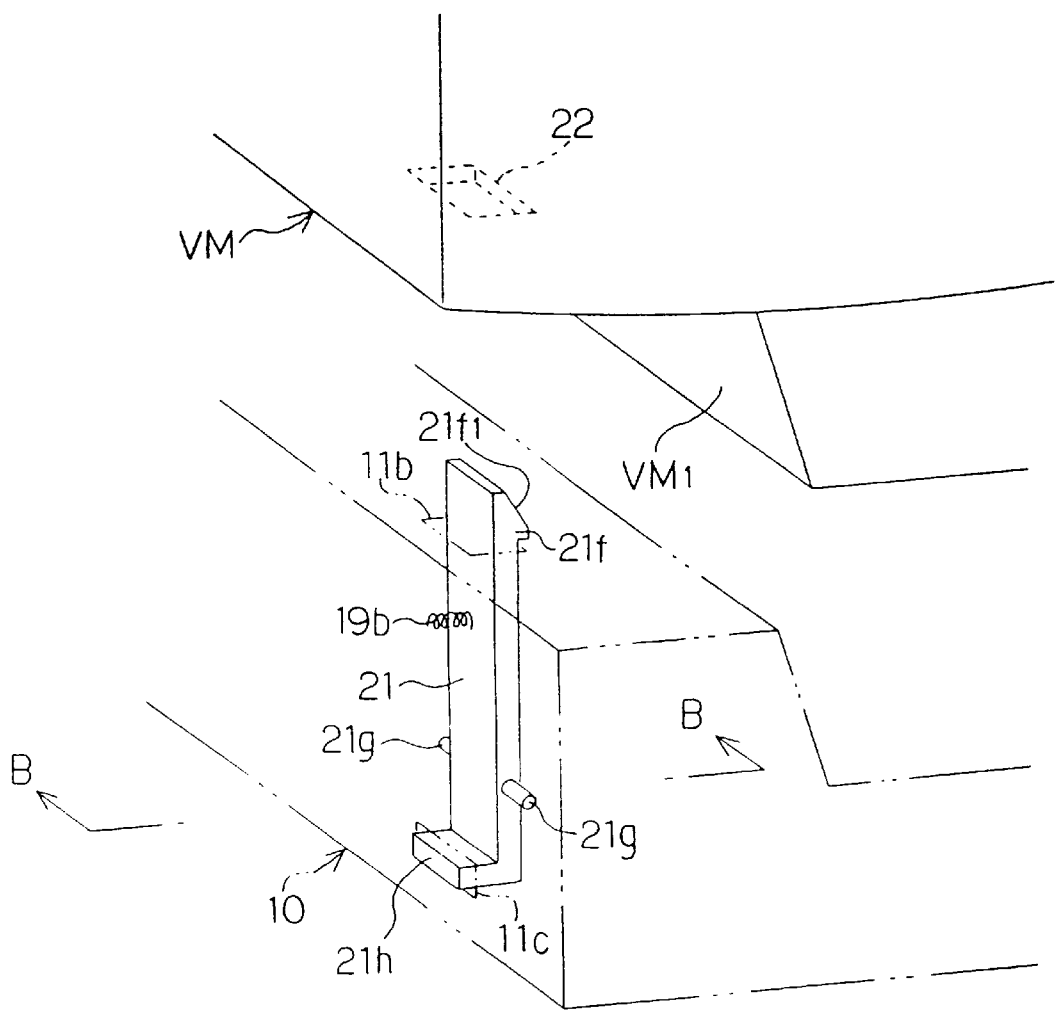
FIG. 14 is a diagram similar to FIG. 12 showing yet another construction of a locking member and a locking hole.
Figure 15:
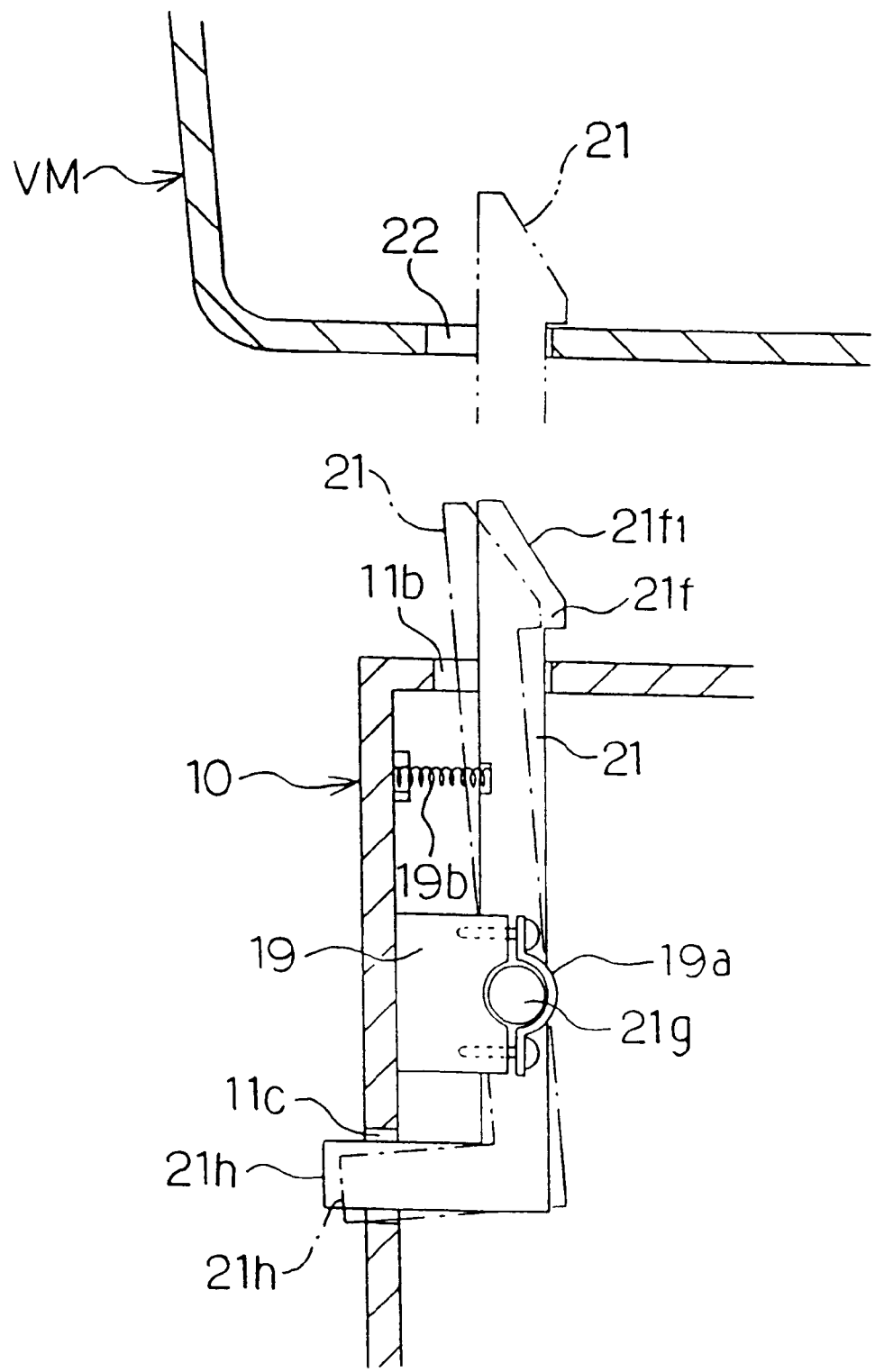
FIG. 15 is an enlarged sectional view taken in the direction of arrows B—B of FIG. 14.

FIGS. 14 and 15 illustrate a fourth construction of a locking member and a locking hole. The locking member shown in these Figures is composed essentially of a lever 21 having an inwardly directed hook 21f at a tip end. Close to the lower end of each lever 21, pivots 21g projecting in opposite directions are formed, and an angled operating part 21h is formed at the lower end of each lever 21. There is formed a slant surface 21f1 on each hook 21f. Each lever 21 is swingably mounted on the case 10 by means of the pivots 21g which are rotatably supported by bearings 19 and metallic clamps 19a. It is to be noted, however, that FIG. 15 shows one such bearing 19 and metallic clamp 19a only.

When each lever 21 has been properly installed, its hook 21f protrudes above an opening 11b formed in the top surface of the case 10 while its operating part 21h juts out through an opening 11c formed in the side surface of the case 10. Further, each lever 21 is forced inward by a spring 19b.

Each locking hole 22 made in a video monitor VM is configured in such a way that the hook 21f of the corresponding lever 21 can be hooked and unhooked.

In this construction, when the hook 21f of each lever 21 is forced into the corresponding locking hole 22, each lever 21 is inclined outward as the slant surface 21f1 is pushed by an edge of the locking hole 22 (as shown by alternate long and short dashed lines in FIG. 15). When the hooks 21f have passed through the bottom of the video monitor VM, the springs 19b cause each lever 21 to return to its upright position and the hook 21f of each lever 21 snaps onto the edge of the corresponding locking hole 22. With this arrangement, it is possible to install a speaker system on the bottom of the front panel of the video monitor VM in a single action.

When removing the speaker system from the video monitor VM, each operating part 21h should be pushed inward so that each hook 21f is moved outward and released and, then, the case 10 should be pulled downward.

Figure 16:
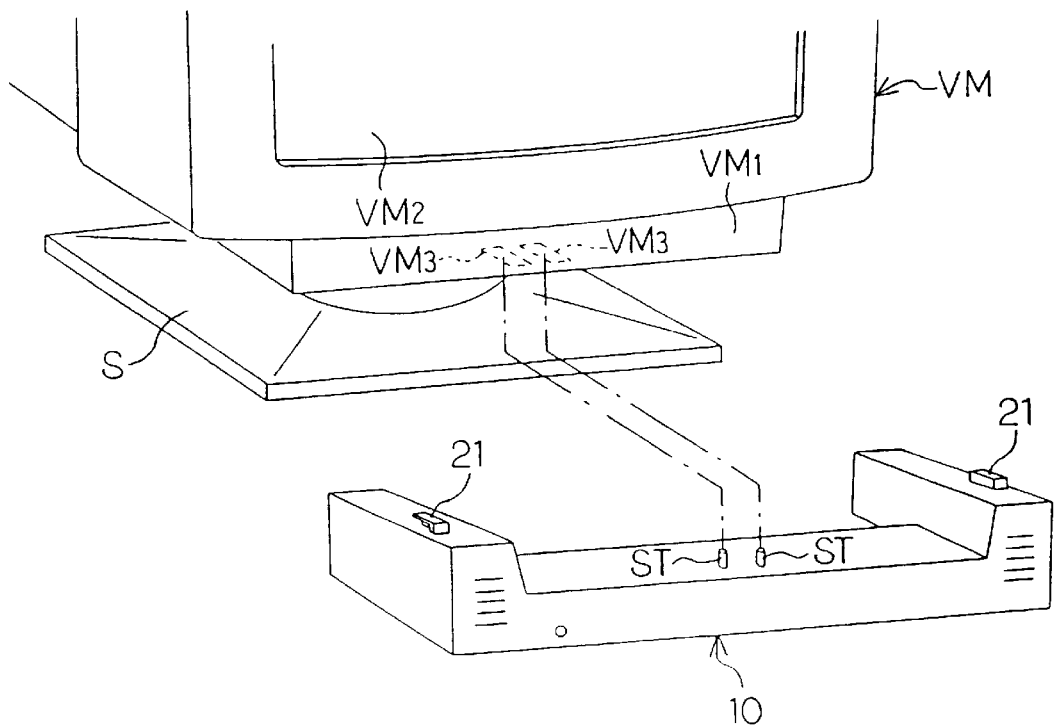
FIG. 16 is a perspective view showing a construction of connecting terminals according to the invention.
Figure 17:
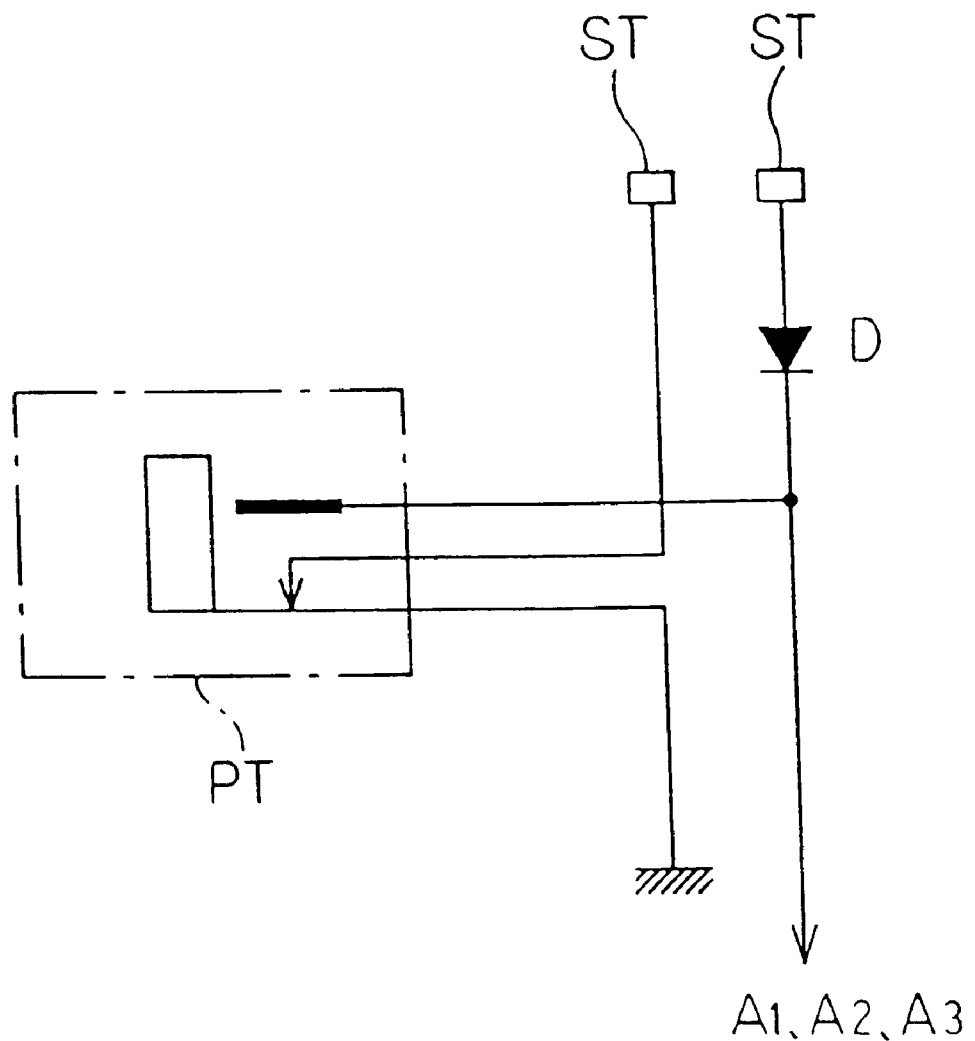
FIG. 17 is a circuit diagram of the connecting terminals.

FIGS. 16 and 17 show the supply of power from a video monitor VM to a speaker system. Referring to these Figures, there are provided automatically connected auxiliary terminals ST on the top surface of the case 10. These auxiliary terminals ST include conductive pins, which are forced upward by unillustrated springs and installed on the case 10 so that they can slide up and down. It is preferable that these auxiliary terminals ST be made corrosion-resistant through appropriate treatment.

The auxiliary terminals ST are connected in parallel with a jack-type power terminal PT through a diode D as shown in FIG. 17. In this configuration, the auxiliary terminals ST, ST can be electrically isolated from amplifiers A1, A2 and A3 by inserting an external power supply plug to the power terminal PT, whereas electric power can be applied to the amplifiers A1, A2 and A3 through the auxiliary terminals ST, ST by disconnecting the plug.

Figure 18:
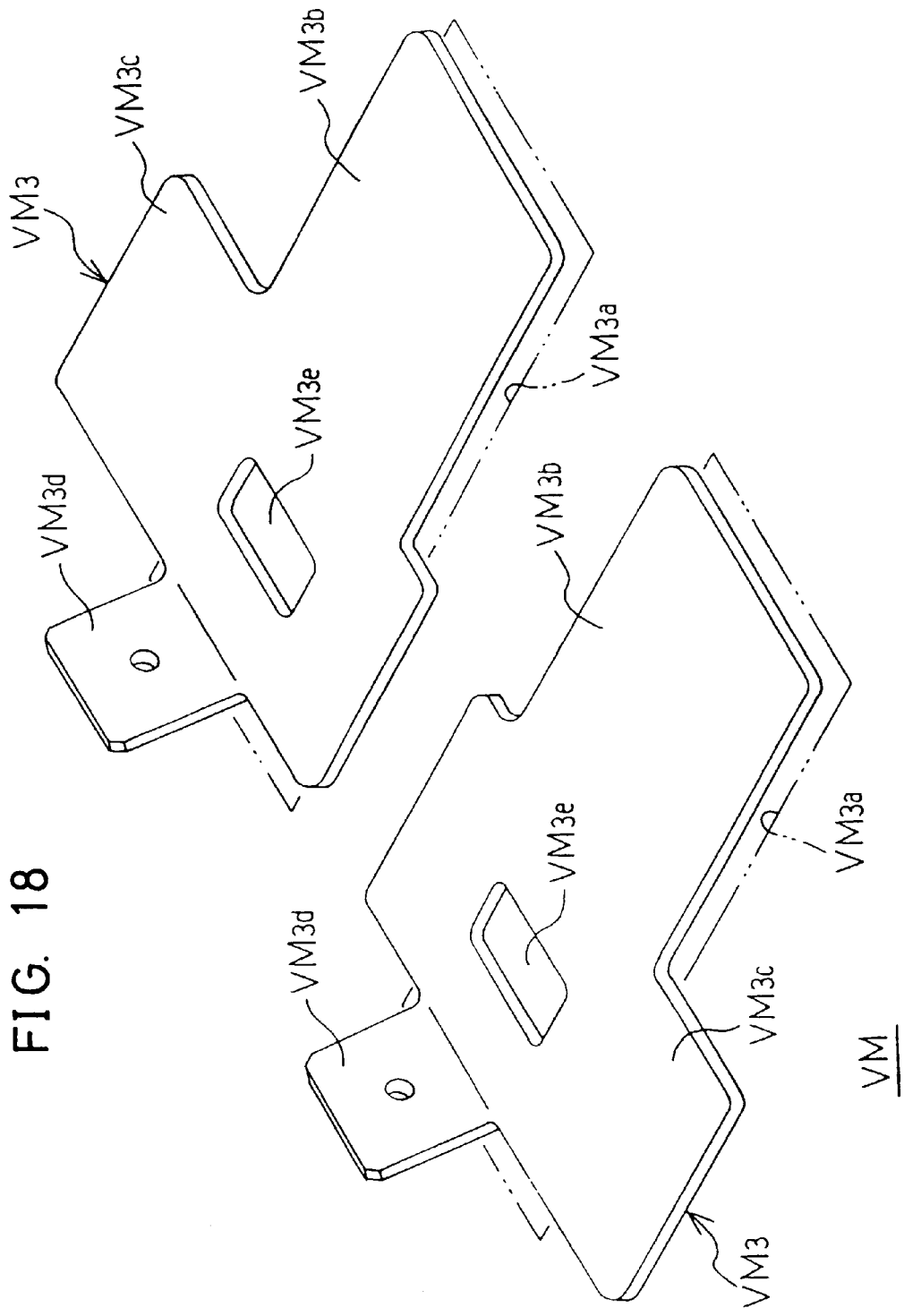
FIG. 18 is a perspective view showing the shape of connecting terminals provided on a video monitor.

On the bottom of the front panel of the video monitor VM, there are provided electrode plates VM3 corresponding to the auxiliary terminals ST as shown in FIG. 18. The individual electrode plates VM3 are exposed through openings VM3a, VM3a formed in the bottom surface of the front panel.

Each electrode plate VM3 has a main contact portion VM3b which comes in electrical contact with the corresponding auxiliary terminal ST, a projecting portion VM3c for polarity identification, a terminal portion VM3d for wiring and a mounting hole VM3e. The terminal portion VM3d of each electrode plate VM3 is bent obliquely upward while the projecting portion VM3c is formed on one side of the main contact portion VM3b. Each terminal portion VM3d is connected to a power supply in the video monitor VM via an unillustrated wire. According to this arrangement, the auxiliary terminals ST go into contact with the respective electrode plates VM3 and power is supplied from the video monitor VM to the speaker system when the case 10 of the speaker system is mounted on the bottom of the front panel of the video monitor VM.

Alternatively, each auxiliary terminal ST may have more than one contact portion ST1 aligned in parallel which comes into contact with each electrode plate VM3 as shown in FIG. 19.

Figure 19A:
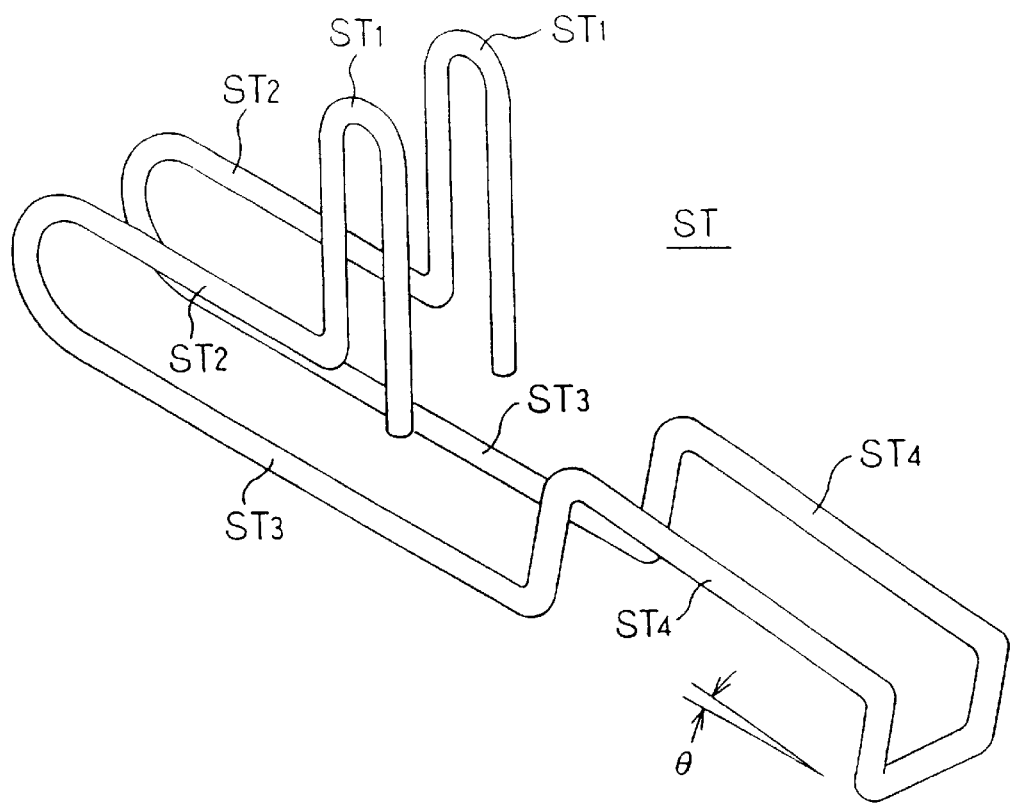
FIG. 19 is a perspective view showing alternative constructions of the connecting terminals.

The auxiliary terminal ST shown in FIG. 19A is a spring structure formed by bending a single, elongated bar member into a specified shape. This auxiliary terminal ST has a pair of contact portions ST1, a pair of supporting portions ST2, ST2, a pair of base portions ST3, ST3 and a pair of fixing portions ST4, ST4. The base portions ST3, ST3 are inclined downward at an angle θ to the fixing portions ST4, ST4 while the supporting portions ST2, ST2 are parallel to the base portions ST3, ST3.

In this construction of the auxiliary terminal ST, when it is connected, the contact portions ST1, ST1 are pushed downward, and then restoring force is exerted through the supporting portions ST2, ST2 that forces the contact portions ST1, ST1 upward. In this construction, each auxiliary terminal ST is mounted with its fixing portions ST4, ST4 fixed to the inside of the top surface of the case 10 by unillustrated metallic retainers and the contact portions ST1, ST1 are projected above the top surface of the case 10.

Figure 19B:
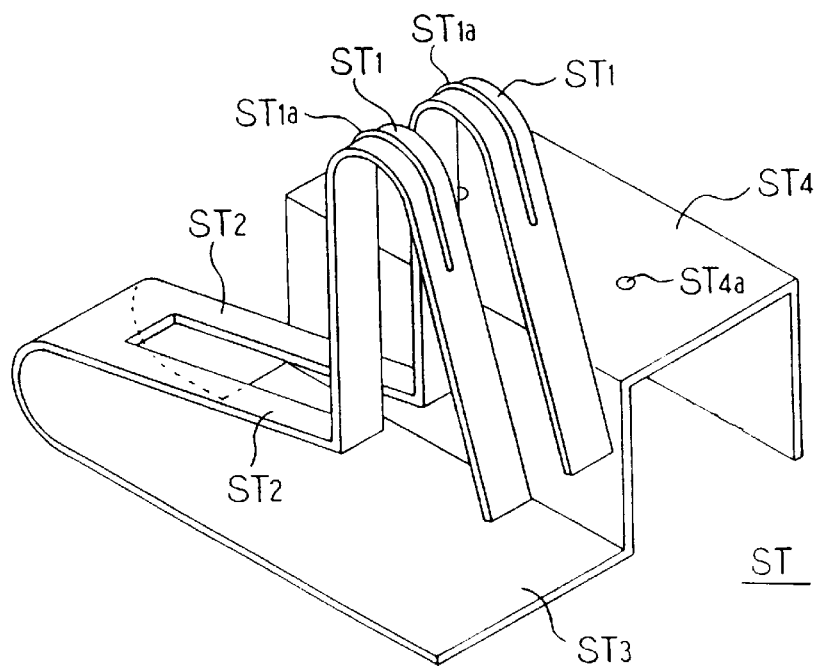

The auxiliary terminal ST shown in FIG. 19B is a spring structure formed by bending a plate member. This auxiliary terminal ST has a pair of contact portions ST1, ST1 with rib ST1a, supporting portions ST2, ST2, a base portion ST3 and a fixing portion ST4. In this construction, each auxiliary terminal ST is fixed to the inside of the top surface of the case 10 by fixing holes ST4a, ST4a of the fixing portion ST4, and the contact portions ST1, ST1 are projected above the top surface of the case 10.

In the individual embodiments described above, the slits 11 are for outputting sound produced by the speakers 13 from the front surface of the case 10 while the slits 11a are for allowing the microphone 14 to pick up sound entered from the outside of the case 10. Therefore, instead of slits, these audio inlets and outlets may take the form of several small holes arranged in a mesh structure, for instance. Furthermore, the front surface of the case 10 may be smoothly curved to match the front shape of the display VM2 of the video monitor VM. If there is not any projecting part VM1 on the bottom of the front panel of the video monitor VM, the top side of the case 10 is formed into a flat shape. In any case, it will be sufficient if the shape of the top side of the case 10 properly fits the shape of the bottom of the front panel of the video monitor VM.

What is claimed as new and desired to be secured by Letters Patent of the United States is:

1. A speaker system for a video monitor supported on a base, said speaker system comprising:

a laterally elongated case having a speaker, the top side of said case formed to match the bottom of a front panel of said video monitor; and a locking member formed on the top side of said case or on the bottom surface of the front panel and a locking hole formed in the bottom surface of said front panel or in the top side of said case, said locking member being engageable with said locking hole;

said case being detachably suspended only from above from the bottom surface of the front panel of said video monitor when the video monitor is placed on the base and said locking member is engaged with said locking hole.

2. A speaker system for a video monitor supported on a base, said speaker system comprising:

a laterally elongated case having a speaker, the top side of said case formed to match the bottom of a front panel of said video monitor; and a locking member formed on the top side of said case or on the bottom of the front panel and a locking hole formed in the bottom of said front panel or in the top side of said case, said locking member being engageable with said locking hole;

said case being detachably suspended only from above from the bottom of the front panel of said video monitor when the video monitor is placed on the base and said locking member is engaged with said locking hole;

wherein said locking hole has a slit extending in the mounting direction; and said locking member includes a platelike guide portion insertable into said slit, a stopper portion formed at the rear end of said platelike guide portion, and a clamping portion extending from said platelike guide portion for hooking onto an edge of said slit.

3. A speaker system as in claim 2, wherein said slit narrows in the mounting direction.

4. A speaker system as in claim 1, wherein said locking member comprises a screw and said locking hole comprises a screw hole into which said screw is tightened.

5. A speaker system for a video monitor supported on a base, said speaker system comprising:

a laterally elongated case having a speaker, the top side of said case formed to match the bottom of a front panel of said video monitor; and a locking member formed on the top side of said case or on the bottom of the front panel and a locking hole formed in the bottom of said front panel or in the top side of said case, said locking member being engageable with said locking hole;

said case being detachably suspended only from above from the bottom of the front panel of said video monitor when the video monitor is placed on the base and said locking member is engaged with said locking hole;

wherein said locking member comprises a lever having a hook at the tip end and said locking hole is engageable with said hook.

6. A speaker system as in claim 1, wherein said case includes a microphone.

7. A speaker system as in claim 1, further comprising automatically connectable terminals on the top side of said case.

8. A speaker system as in claim 1, further comprising a vibration insulator at a portion of said case which comes into contact with the bottom of the front panel.

9. A speaker system as in claim 2, wherein said case includes a microphone.

10. A speaker system as in claim 3, wherein said case includes a microphone.

11. A speaker system as in claim 4, wherein said case includes a microphone.

12. A speaker system as in claim 5, wherein said case includes a microphone.

13. A speaker system as in claim 2, further comprising automatically connectable terminals on the top side of said case.

14. A speaker system as in claim 3, further comprising automatically connectable terminals on the top side of said case.

15. A speaker system as in claim 4, further comprising automatically connectable terminals on the top side of said case.

16. A speaker system as in claim 5, further comprising automatically connectable terminals on the top side of said case.

17. A speaker system as in claim 6, further comprising automatically connectable terminals on the top side of said case.

18. A speaker system as in claim 2, further comprising a vibration insulator at a portion of said case which comes into contact with the bottom of the front panel.

19. A speaker system as in claim 3, further comprising a vibration insulator at a portion of said case which comes into contact with the bottom of the front panel.

20. A speaker system as in claim 4, further comprising a vibration insulator at a portion of said case which comes into contact with the bottom of the front panel.

21. A speaker system as in claim 1, wherein said locking member is formed on the top side of said case and said locking hole is formed in the bottom of said front panel.

22. A speaker system as in claim 1, wherein said locking member is formed on the bottom of said front panel and said locking hole is formed in the top side of said case.

23. A speaker system comprising:

display means;

support means for supporting said display means;

audio means for processing audio signals, the top side of said audio means being formed to match the bottom of said display means, said audio means including a case detachably suspended only from above from a bottom surface of said display means; and locking means for detachably suspending said audio means only from above from the bottom surface of said display means.

24. A speaker system as in claim 23, wherein said audio means comprises:

a speaker.

25. A speaker system as in claim 24, wherein said audio means further comprises:

a microphone.

26. A speaker system as in claim 24, wherein said audio means further comprises:

connection means for automatically forming an electrical connection between said audio means and said display means.

27. A speaker system as in claim 24, wherein said audio means further comprises:

vibration insulation means for insulating said display means from vibration of said audio means.

* * * * *